United States Patent
Wynne et al.

(10) Patent No.: US 10,926,462 B2
(45) Date of Patent: Feb. 23, 2021

(54) INTEGRATION OF THREE DIMENSIONAL PRINTING PROCESSES

(71) Applicant: 3D Systems, Inc., Rock Hill, SC (US)

(72) Inventors: Ben Wynne, Escondido, CA (US); Andrew Enslow, Escondido, CA (US); Evan Kuester, San Francisco, CA (US)

(73) Assignee: 3D Systems, Inc., Rock Hill, SC (US)

( * ) Notice: Subject to any disclaimer, the term of this patent is extended or adjusted under 35 U.S.C. 154(b) by 207 days.

(21) Appl. No.: 15/807,170

(22) Filed: Nov. 8, 2017

(65) Prior Publication Data

US 2018/0229432 A1 Aug. 16, 2018

Related U.S. Application Data

(60) Provisional application No. 62/457,474, filed on Feb. 10, 2017.

(51) Int. Cl.
*B29C 64/20* (2017.01)
*B33Y 40/00* (2020.01)
(Continued)

(52) U.S. Cl.
CPC ............ *B29C 64/20* (2017.08); *B29C 64/124* (2017.08); *B29C 64/153* (2017.08);
(Continued)

(58) Field of Classification Search
CPC ... B29C 64/124; B29C 64/245; B29C 64/264; B29C 64/35; B29C 64/379
See application file for complete search history.

(56) References Cited

U.S. PATENT DOCUMENTS 9,216,546 B2   12/2015  DeSimone et al.
2015/0165695 A1 * 6/2015  Chen ............... B33Y 30/00
                                          425/132
(Continued)

FOREIGN PATENT DOCUMENTS

WO    2015142546         9/2015
WO    2016149151         3/2016
WO    WO-2016149151 A1 * 9/2016 ........... B29C 64/135

OTHER PUBLICATIONS

PCT International Search Report the International Searching Authority for PCT/US2017/060634, dated Feb. 12, 2018 (7 pages).
(Continued)

*Primary Examiner* — Xiao S Zhao
*Assistant Examiner* — Nicholas J Chidiac

(57) ABSTRACT

A three dimensional printing system includes a print engine, a fluid processing station, a fixture, a transport mechanism, and a controller. The fluid processing station includes a fluid injector port coupled to a fluid source. The fixture has a lower portion with a lower face and a first fluid conduit coupled to the lower face. The controller is configured to: (a) Operate the print engine to form a three dimensional article of manufacture onto the lower face and thereby defining an internal cavity and an inlet port that couples the internal cavity to the first fluid conduit of the fixture. (c) Transfer the fixture to the fluid processing station. (d) Couple the fluid injector port of the fluid processing station to the first fluid conduit of the fixture. (e) Operate the fluid source to inject fluid out of the fluid injector port and into the internal cavity.

7 Claims, 7 Drawing Sheets

(51) Int. Cl.
    *B29C 64/379*     (2017.01)
    *B29C 64/124*     (2017.01)
    *B29C 64/35*     (2017.01)
    *B29C 64/129*     (2017.01)
    *B33Y 10/00*     (2015.01)
    *B29C 64/245*     (2017.01)
    *B33Y 30/00*     (2015.01)
    *B29C 64/153*     (2017.01)
    *B29C 64/393*     (2017.01)
    *B29C 64/227*     (2017.01)
    *B33Y 50/02*     (2015.01)

(52) U.S. Cl.
    CPC ............ *B29C 64/227* (2017.08); *B29C 64/35* (2017.08); *B29C 64/379* (2017.08); *B29C 64/393* (2017.08); *B33Y 40/00* (2014.12); *B29C 64/129* (2017.08); *B29C 64/245* (2017.08); *B33Y 10/00* (2014.12); *B33Y 30/00* (2014.12); *B33Y 50/02* (2014.12)

(56) References Cited

U.S. PATENT DOCUMENTS

2016/0074911 A1*   3/2016   Dore ........................ B08B 3/006
                                                                                        134/56 R
2016/0354981 A1*  12/2016  Bredemeyer ........... B29C 39/02

OTHER PUBLICATIONS

PCT Written Opinion of the International Searching Authority for PCT/US2017/060634, dated Feb. 12, 2018 (7 pages).

\* cited by examiner

US 10,926,462 B2

INTEGRATION OF THREE DIMENSIONAL PRINTING PROCESSES

CROSS REFERENCE TO RELATED APPLICATIONS

This non-provisional patent application claims priority to U.S. Provisional Application Ser. No. 62/457,474, Entitled "INTEGRATION OF THREE DIMENSIONAL PRINTING PROCESSES" by Ben Wynne et al., filed on Feb. 10, 2017, incorporated herein by reference under the benefit of U.S.C. 119(e).

FIELD OF THE INVENTION

The present disclosure concerns a three dimensional printing system for the digital fabrication of three dimensional articles. More particularly the present disclosure concerns an effective way of integrating print engines and post-processes into a manufacturing work cell.

BACKGROUND

Three dimensional print engines are in widespread use. Examples of three dimensional print technologies includes stereolithography, selective laser sintering, and fused deposition modeling to name a few. Stereolithography-based printers utilize a controllable light engine to selectively harden or solidify a liquid photocurable resin in a layerwise manner until a three dimensional article of manufacture is formed. In some embodiments the light engine includes a light source that illuminates a spatial light modulator.

After a print engine completes a three dimensional article of manufacture there are post-processes to wash away unused photocurable resin, drying residual fluid, and curing. The post-processes can be very labor and time intensive. Because most three dimensional printing has been used for low volume prototyping, the post-processes have been acceptable.

However, there is a desire to utilize stereolithography print engines for manufacturing. This requires automation of the printing and post-processes. The post-processes as they exist are not designed for automation. The post-processes can become even more challenging when fine geometries are involved. There is a need to find better solutions for integrating and automating all of the processes for three dimensional printing systems.

SUMMARY

Figure 1:
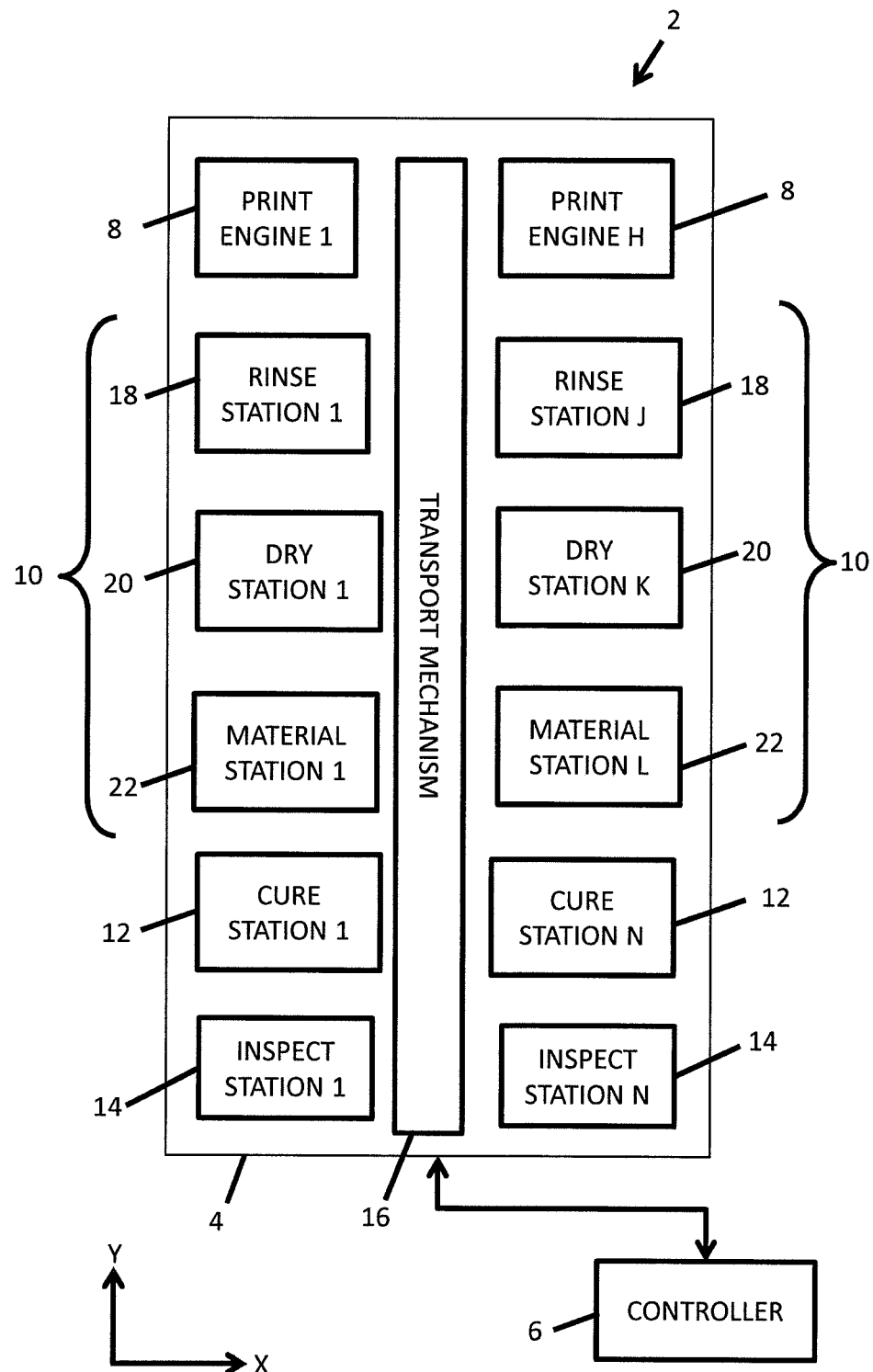
FIG. 1 is a schematic block diagram depicting an exemplary three dimensional printing system 2.

In a first aspect of the disclosure, a three dimensional printing system includes a three dimensional print engine, a fluid processing station, a fixture, a transport mechanism, and a controller. The three dimensional print engine includes a vessel for containing photocurable resin including a transparent sheet at a lower end, a light engine for transmitting pixelated light up through the transparent sheet into the photocurable resin, and a movement mechanism. The fluid processing station includes a fluid injector port coupled to a fluid source. The fixture has a lower portion defining a lower face and a first fluid conduit coupled to the lower face. The controller is configured to: (a) Position the lower face of the fixture in facing relation with the transparent sheet. (b) Operate the three dimensional print engine including the light engine and the movement mechanism to form a three dimensional article of manufacture onto the lower face of the fixture, the three dimensional article of manufacture having an inside surface defining an internal cavity and an inlet port that couples the internal cavity to the first fluid conduit of the fixture. (c) Operate the transport mechanism to transfer the fixture with the attached three dimensional article of manufacture to the fluid processing station. (d) Couple the fluid injector port of the fluid processing station to the first fluid conduit of the fixture. (e) Operate the fluid source to inject fluid out of the fluid injector port, through the first fluid conduit, through the inlet port, and to the internal cavity.

In one implementation the light engine includes a light source that illuminates a spatial light modulator. The spatial light modulator processes light form the light source to provide an array of pixel elements projected onto a build plane. In one embodiment the spatial light modulator is an array of micromirrors that can be tilted between on states and off states.

In another implementation the fluid processing station is a rinse station. The fluid source contains a liquid cleaning solvent. Step (e) results in the cleaning solvent flushing uncured photocurable resin out the of the internal cavity of the three dimensional article of manufacture.

In yet another implementation the fluid processing station is a drying station. The fluid source contains a pressurized gas. Step (e) results in the dry gas flushing resin or solvent out of the internal cavity of the three dimensional article of manufacture.

In a further implementation the fluid processing station is a build material injection station. The fluid source contains build material. Step (e) results in the filling of the internal cavity with build material. In one embodiment the internal cavity functions as a removable mold for the build material.

In a yet further implementation the fluid source contains an etchant. Step (e) includes etching the inside surface of the three dimensional article of manufacture.

In another implementation the fluid source contains a coating agent. Step (e) includes coating the inside surface of the three dimensional article of manufacture with a material layer.

In yet another implementation step (e) includes partially melting the inside surface. The fluid source can be heated and/or contain a solvent that can dissolve away a layer of material from the inside surface.

In a further implementation the inside surface defines a fluid manifold that establishes an optimized flow regime of the injected fluid through the internal cavity.

In a yet further implementation the three dimensional article of manufacture also defines an exit port that couples the internal cavity to an outside surface of the three dimensional article of manufacture. The exit port allows fluid to exit from the internal cavity while the injected fluid is entering the internal cavity. The exiting fluid can be one or more of a displaced fluid and the injected fluid and a mixture thereof. In a first embodiment the fluid processing station includes a receptacle for receiving the exiting fluid. In a second embodiment the fixture includes a second fluid conduit that is coupled to the exit port.

In another implementation a cure station has an optical component for utilizing the first fluid conduit and the inlet port for transmitting radiation into the internal cavity to enhance radiation curing of the three dimensional article of manufacture. In one embodiment the optical component is a light pipe.

In yet another implementation the controller includes a processor coupled to an information storage device. The information storage device includes a non-transient or nonvolatile information storage device that stores instructions. The instructions, when executed, control portions of the three dimensional printing system such as a print engine, a fluid processing station, a cure station, or an inspection station. The controller can be integrated into one integrated circuit or it can reside on a plurality of devices. Such a plurality of devices can be co-located or can be distributed in various locations in the three dimensional printing system or even remotely from one another.

DETAILED DESCRIPTION OF THE PREFERRED EMBODIMENTS

In the disclosure mutually orthogonal axes X, Y, and Z are used. Axes X and Y are lateral axes and can be horizontal axes. Axis Z is can be a vertical axis. Generally speaking a direction of +Z is upward and −Z is downward. However, the axis Z may not be exactly aligned with a gravitational reference.

FIG. 1 is a schematic block diagram depicting an exemplary three dimensional printing system 2. Three dimensional printing system 2 includes a work cell 4 under control of controller 6. Controller 6 controls stations (8, 10, 12, 14) within the work cell 4 and a transport 16 between the stations. In one embodiment controller 6 is a "standalone" workstation 6 that can be operated by a technician. In another embodiment controller 6 is a server 6 that is controllable remotely by other servers and/or client devices. In an exemplary embodiment controller 6 has both server and workstation capabilities.

The work cell 4 includes print engines 8, fluid processing stations 10, cure stations 12, inspection stations 14, and a transport mechanism 16. The print engines 8 are those that utilize a photocurable resin and can fabricate a three dimensional article of manufacture by the sequential curing and hardening of polymer layers of the resin. An exemplary print engine will be described with respect to FIG. 2.

The fluid processing stations 10 are configured to automatically inject fluid into and through a three dimensional article of manufacture in order to provide cleaning, drying, etching, coating, or material injection. In the exemplary embodiment the fluid processing stations 10 include rinse stations 18, dry stations 20, and material stations 22. Rinse stations 18 are for injecting a cleaning solvent to remove residual uncured resin from a three dimensional article of manufacture. Dry stations 20 are for injecting gas for removing and drying fluid such as the cleaning solvent. Material stations 22 are for injecting a body material into the three dimensional article of manufacture. Material stations 22 enable the three dimensional article of manufacture to be utilized as a mold and/or provide a composite three dimensional article of manufacture made of two different materials.

Additional fluid processing stations 10 not illustrated can be part of work cell 4. Different fluid sources can be used such as chemical etchants, fluids that leave behind a coating, or fluids that partially melt the inside. Heated or chilled fluids can be utilized.

Cure stations 12 provide radiation and/or thermal curing for the three dimensional article of manufacture. Inspection stations 14 can be programmed to inspect critical dimensions and features of the three dimensional article of manufacture. Transport mechanism 16 provides automated transport between the stations 8, 10, 12, and 14. The transport mechanism 16 may include a robotic gripping mechanism that has translation motion in three dimensions along X, Y, and Z.

Figure 2:
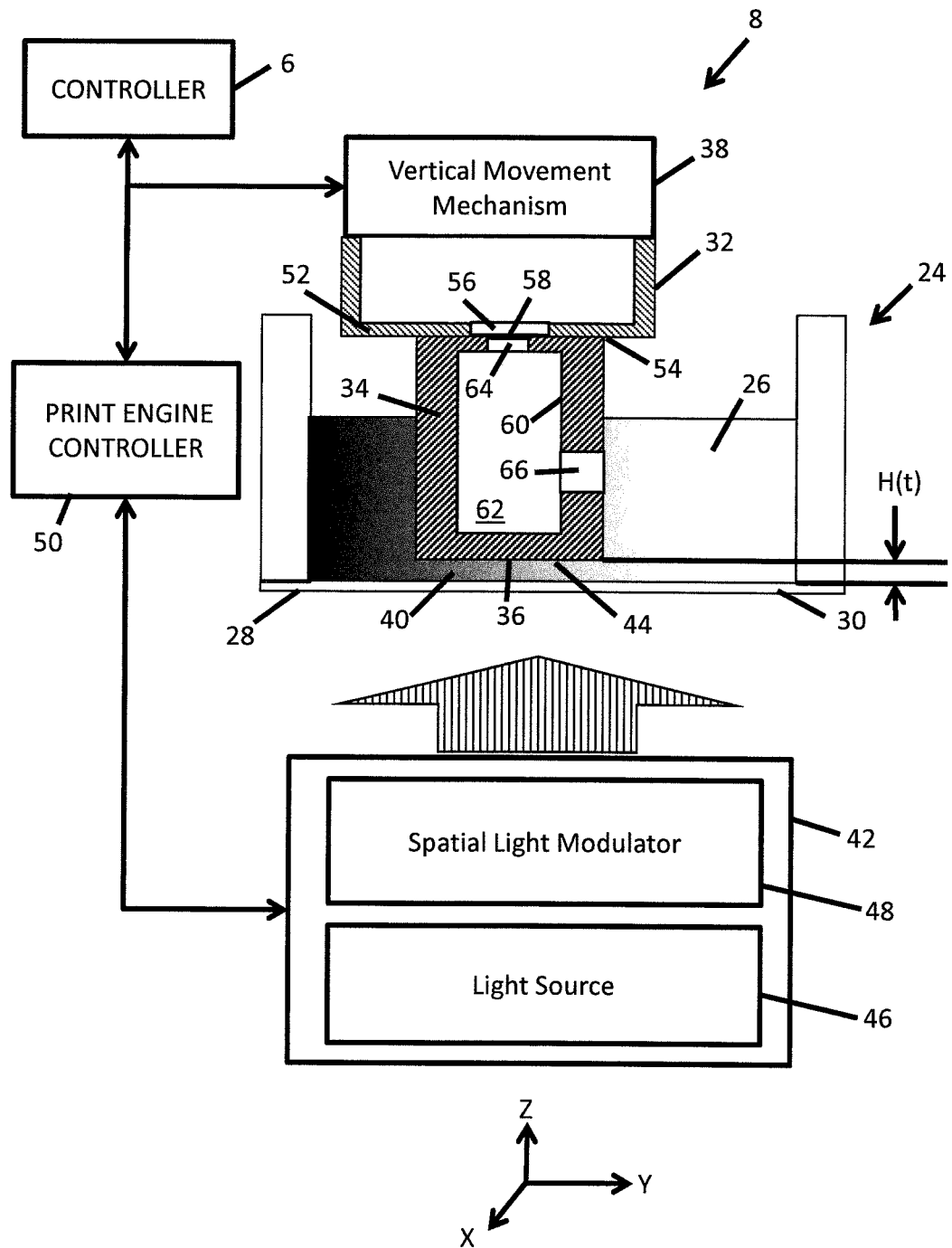
FIG. 2 is a schematic diagram depicting an exemplary print engine.

FIG. 2 is a schematic block diagram depicting an exemplary embodiment of the print engine 8. Print engine 8 includes a vessel 24 for containing photocurable resin 26 and having a lower portion 28 with a transparent sheet 30. A fixture 32 supports a three dimensional article of manufacture 34 that is being formed in photocurable resin 26. The three dimensional article of manufacture 34 has a lower face 36 in facing relation with the transparent sheet 30. A movement mechanism 38 is coupled to the fixture 32 and controls a height H(t) of the lower face 36 above the transparent sheet 30. Between the lower face 36 of the three dimensional article of manufacture 34 is a thin layer 40 of photocurable resin 26.

A light engine 42 is disposed and arranged to project pixelated radiation up through the transparent sheet 30 to selectively illuminate a build plane 44 that is proximate to the lower face 36 of the three dimensional article of manufacture 34. Light engine 42 includes a light source 46 that illuminates a spatial light modulator 48. The spatial light modulator 48 includes an array of pixel elements that process "raw" or unprocessed light from the light source 46 to selectively illuminate pixel elements of build plane 44.

Print engine 8 includes print engine controller 50 which controls the vertical movement mechanism 38 and the light engine 48 when print engine 8 is fabricating the three dimensional article of manufacture 34. The print engine controller 50 is under control of the work cell controller 6.

Fixture 32 includes a lower portion 52 defining a lower face 54 upon which the three dimensional article of manufacture 34 is formed. Formed into fixture 32 is a first fluid conduit 56 that defines an opening 58 on lower face 54. First fluid conduit 56 is illustrated as a vertical conduit through the lower portion 52 of fixture 32. In an alternative embodiment the first fluid conduit 56 may take another route through a fixture 32 but would still couple to opening 58 on lower face 54.

The three dimensional article of manufacture 34 has an inside surface 60 that defines an internal cavity 62. The three dimensional article of manufacture 34 also defines a inlet port 64 that is formed in alignment and fluidically coupled to the opening 58 on lower face 54. Thus the inlet port 64 couples the fluid conduit 56 to the internal cavity 62. The three dimensional article of manufacture 34 defines an exit port 66 that couples the internal cavity 62 to an external portion of the three dimensional article of manufacture 34.

Figure 3A:
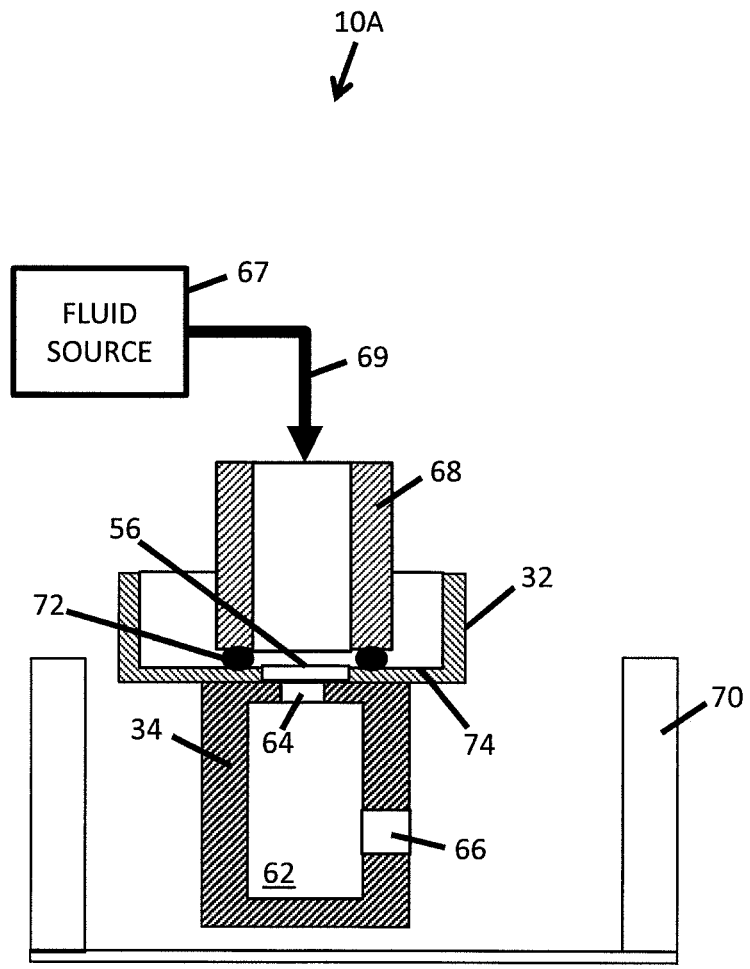
FIG. 3A is a schematic diagram depicting a first embodiment of a fluid processing station engaged with a fixture that is supporting a three dimensional article of manufacture.

FIG. 3A is a schematic block diagram depicting a first embodiment of a fluid processing station 10A that is engaged with a fixture 32 which is supporting a three dimensional article of manufacture 34. Fluid processing station 10A includes a fluid source 67 that is fluidically coupled to a fluid injector port 68 and a containment receptacle 70. In one embodiment a tube 69 couples the fluid source 67 to the fluid injector port 68.

The fluid injector port 68 is sealingly engaged with the first fluid conduit 56. The fluid processing station 10A is therefore configured to inject fluid from the fluid source 67, through fluid injector 68, through first fluid conduit 56, through inlet port 64, and into the internal cavity 62. The injected fluid along with displaced fluid can exit through exit port 66 and into the containment receptacle 70.

In the illustrated embodiment the fluid injector port 68 includes an annular sealing member 72 for providing a face seal between the fluid injector port 68 and an upper surface 74 of the fixture 32. In one embodiment the sealing member 72 is an o-ring.

Figure 3B:
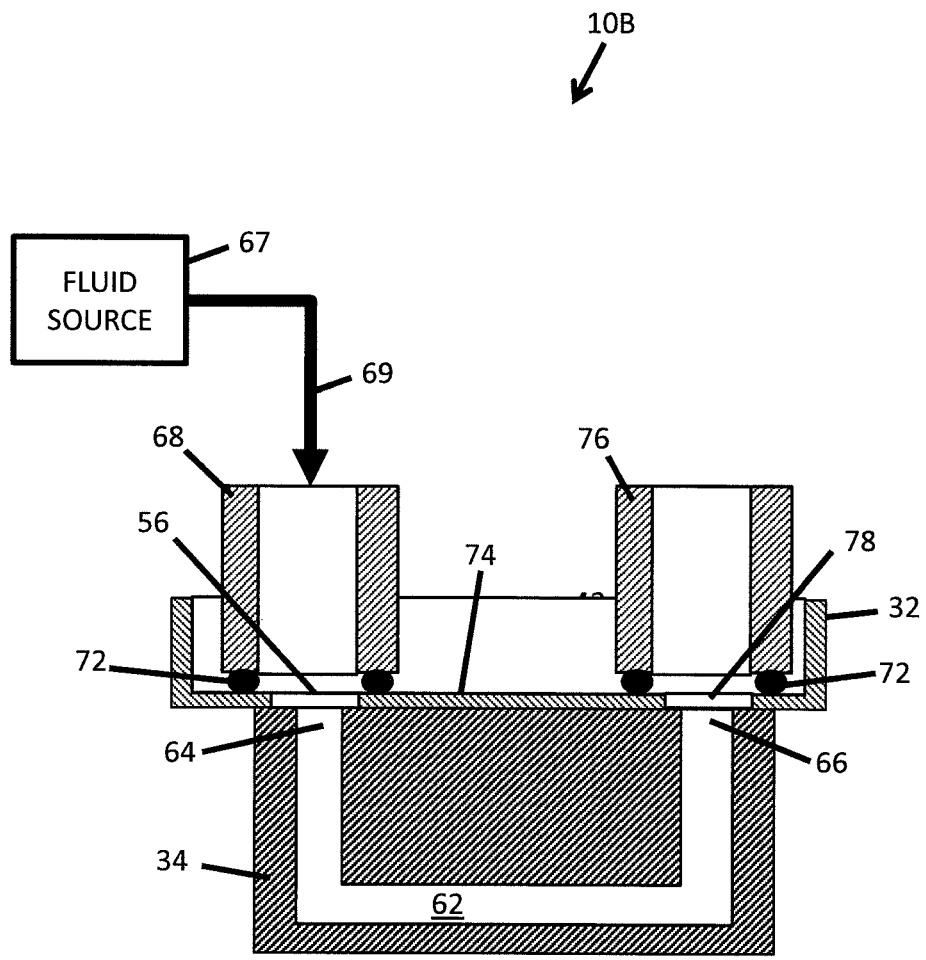
FIG. 3B is a schematic diagram depicting a second embodiment of a fluid processing station engaged with a fixture that is supporting a three dimensional article of manufacture.

FIG. 3B is a schematic block diagram depicting a second embodiment of a fluid processing station 10B engaged with fixture 32 supporting a three dimensional article of manufacture 34. Fluid processing station 10B includes a fluid source 67 that is fluidically coupled to fluid injector port 68. Fluid processing station 10B also includes a fluid receiver port 76.

Similar to FIG. 3A, the fluid injector port is 68 is sealingly engaged with the first fluid conduit 56. The fluid processing station 10B is therefore configured to inject fluid from the fluid source 67, through fluid injector 68, through first fluid conduit 56, through inlet port 64, and into the internal cavity 62.

In this embodiment, the fixture 32 includes a second fluid conduit 78 that is aligned with the fluid exit port 66 of the three dimensional article of manufacture 34. The fluid receiver port 76 is sealingly engaged with the second fluid conduit 78. Thus, the injected fluid can exit through the exit port 66, through the second fluid conduit 78, and into the fluid receiver port 76. In the illustrated embodiment both the fluid injector port 68 and the fluid receiver port 76 include a sealing member 72 for sealing to the upper surface 74 of the fixture.

The inside surface 60 can also have a geometry or manifold that facilitates an optimized fluid flow of the injected fluid through the three dimensional article of manufacture 34. Such an optimized geometry can be utilized for various embodiments including those depicted in FIGS. 3A and FIG. 3B.

Figure 4:
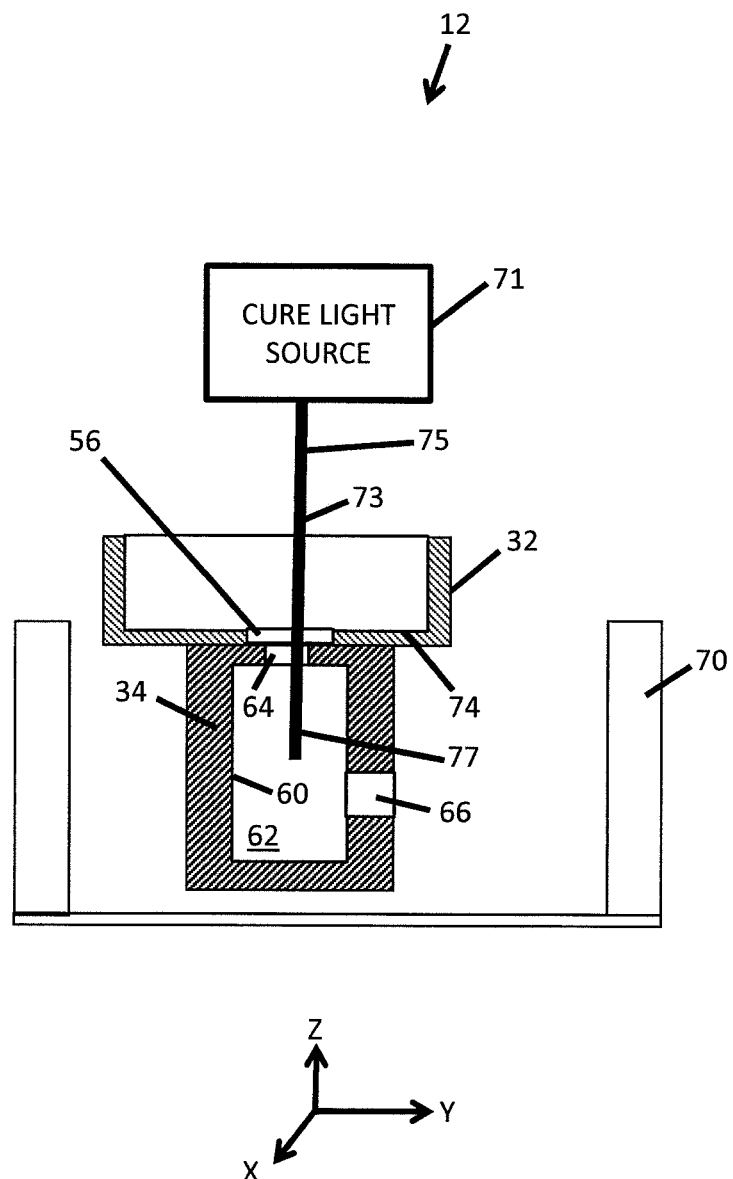
FIG. 4 is a schematic diagram depicting a cure station.

FIG. 4 is a schematic block diagram depicting cure station 12 that utilizes the aligned combination of the conduit 56 and the inlet port 64 to facilitate curing of the three dimensional article of manufacture 34. Cure station 12 includes a cure light source 71 to illuminate the inside surface 60 of the three dimensional article of manufacture 34. In one embodiment a light pipe 73 is utilized to transmit the light between the light source and the internal cavity 62. The light pipe passes from the light source 71, through the conduit 56, through the inlet port 64, and into the internal cavity 62. In one embodiment the light pipe 73 has an upper portion that utilizes total internal reflection to transmit the light from the light source 71 to the conduit 56. The light pipe 73 can have a lower portion 77 that has features that cause light emission such as utilizing controlled facets or a material that "frustrates" the total internal reflection causing the light pipe 73 to emit light along the lower portion 77.

Figure 5:
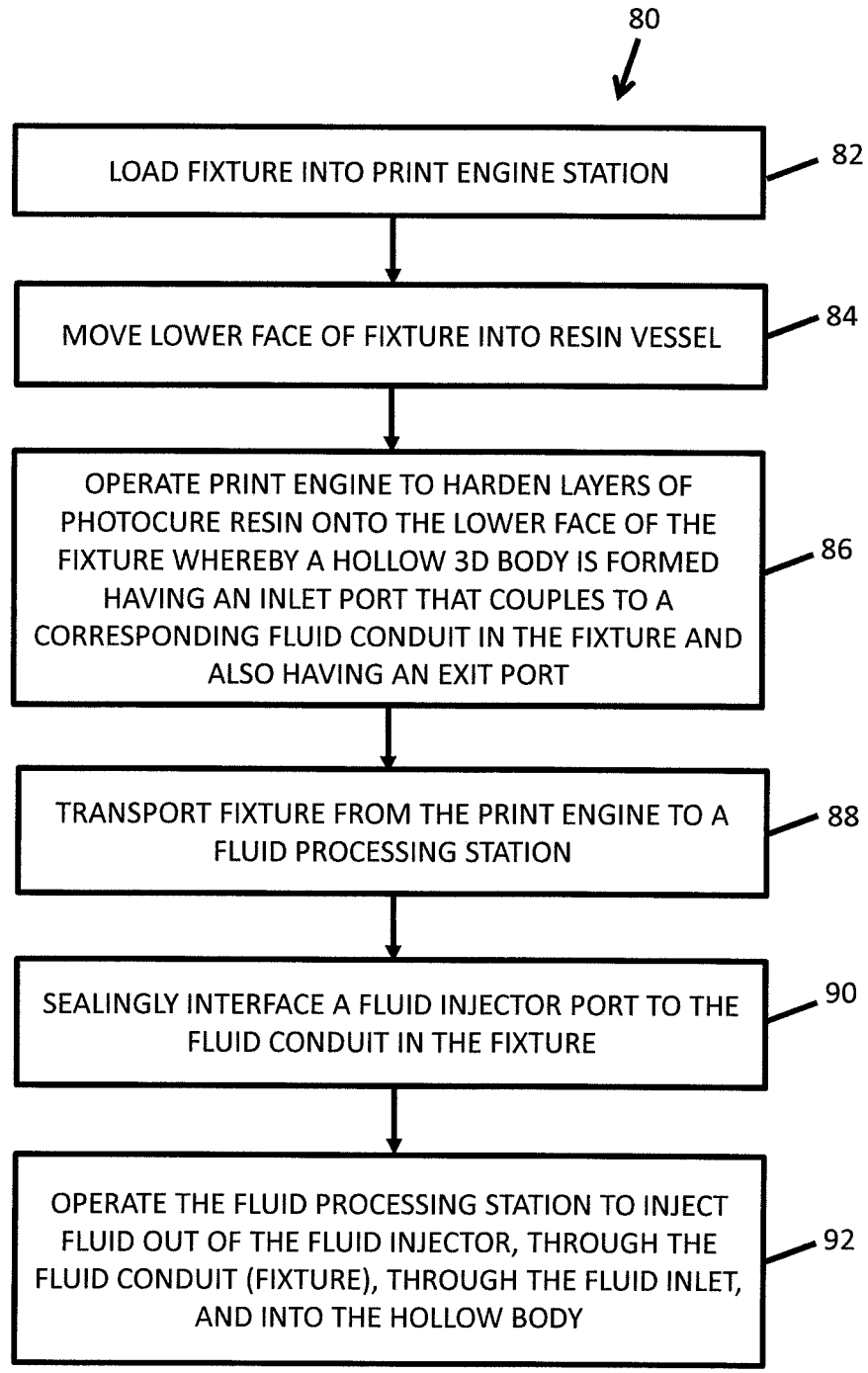
FIG. 5 is a flowchart depicting an exemplary operational process for the printing system.

FIG. 5 is a flowchart depicting an exemplary operational process 80 for the printing system 2. Process 80 does not include all steps but those that emphasize automation related to the fluid processing stations 10. The steps of process 80 occur under the control of work cell controller 6 as it controls the print engines 8, fluid processing stations 10, and transport mechanism 16.

According to step 82, a fixture 32 is loaded into a print engine 8. In one embodiment the transport mechanism 16 grasps and lifts a new fixture 32 from a stack and then inserts it into print engine 8. The fixture 32 has a first fluid conduit 56 that defines an opening 58 at a lower surface 54 of fixture 32. In some embodiments the fixture 32 can include a second fluid conduit 78 as in FIG. 3B.

According to step 84, the vertical movement mechanism 38 moves the fixture 32 downward until the lower face 54 of fixture 16 is immersed in photocurable resin 26 and in facing relation with the transparent sheet 30.

According to step 86, the print engine 8 operates the light engine 42 and the vertical movement mechanism 38 to form the three dimensional article of manufacture 34 onto and extending downward from the lower face 54 of fixture 32. The three dimensional article of manufacture 34 is hollow and therefore has an inside surface 60 defining an internal cavity 62. The three dimensional article of manufacture 34 includes an inlet port 64 that is aligned with the opening 58 and couples the opening 58 to the internal cavity 62. The three dimensional article of manufacture 34 also includes an exit port 66.

In one embodiment, step 86 includes the following substeps under control of print engine controller 58: (a) The light engine selectively illuminates build plane 44 with pixelated light to selectively cure and harden a layer of photocurable resin 26 onto the lower face 54 of fixture 32. This is the first layer of the three dimensional article of manufacture 34; (b) The vertical movement mechanism repositions the lower face 36 of the three dimensional article of manufacture 34; (c) Step a is repeated except to harden a new layer of photocurable resin 26 onto the lower face 36 of the three dimensional article of manufacture 34. Steps b and c are repeated until the three dimensional article of manufacture 34 is fully formed. The motion in step b can include up and down motion and may vary in magnitude during step 86.

According to step 88, the transport mechanism 16 removes the fixture 32 from the print engine 8 and places the fixture 32 into a fluid processing station 10. According to step 90, the fluid injector port 68 of the fluid processing station 10 sealingly engages with the first fluid conduit 56 of fixture 32.

According to step 92, the fluid processing station 10 injects fluid through the fluid injector port 68. The injected fluid flows (1) out of the fluid injector port 68, (2) through the first fluid conduit 56, (3) through the inlet port 64, and (4) into the internal cavity 62. Fluid also flows out of the exit port 66, the exiting fluid can include displaced fluid and some of the injected fluid.

Figure 6:
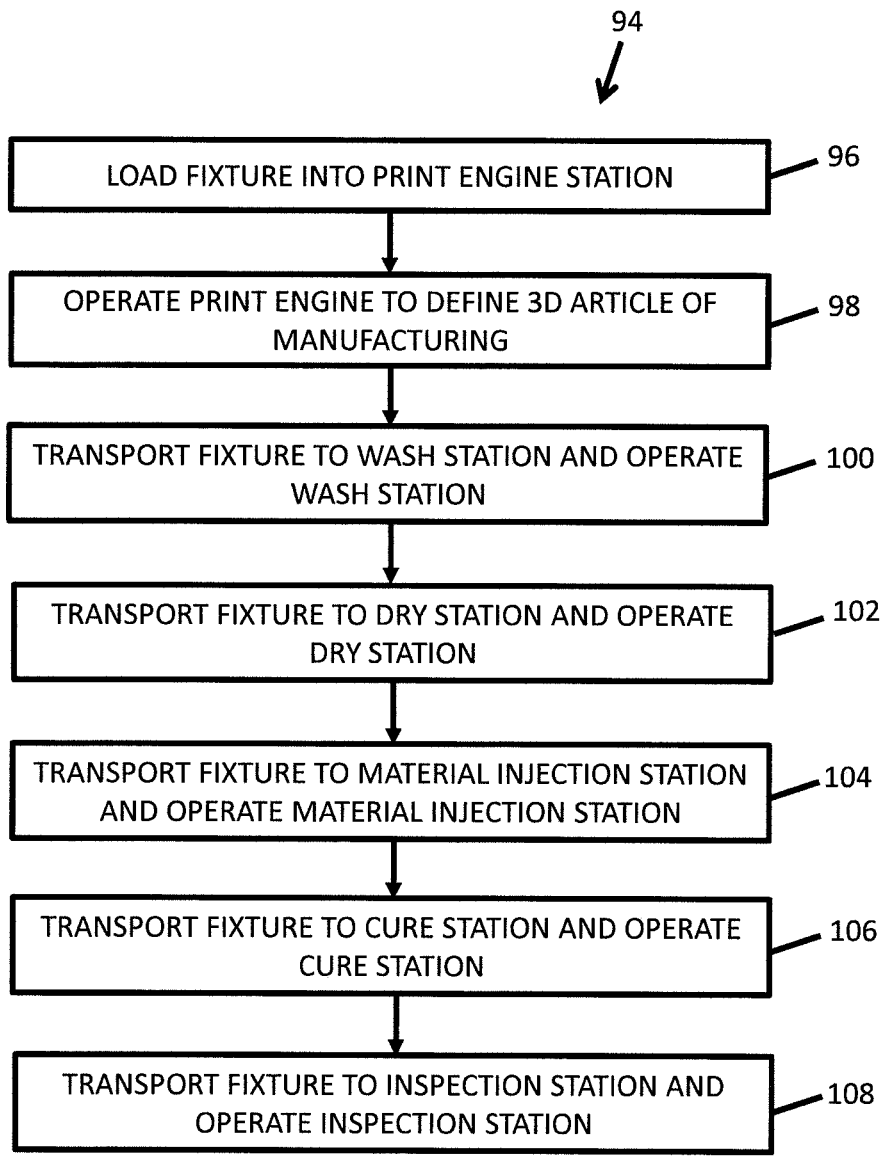
FIG. 6 is a flowchart depicting an exemplary operational process for the printing system.

FIG. 6 is a flowchart depicting a method 94 of operating the printing system 2 utilizing all of the stations illustrated in FIG. 2. According to step 96 fixture 32 is loaded into print engine station 8. Step 96 may be similar to step 82 of FIG. 5. According to step 98, the print engine 8 is operated to fora three dimensional article of manufacture 34. Step 98 may be similar to steps 84 and 86 of FIG. 5.

According to step 100, the fixture 32 is transported to a rinse station 18 which is then operated to clean the three dimensional article of manufacture 34. Step 100 is similar to steps 88, 90, and 92 in which the fluid source 67 is a solvent for flushing out uncured photocurable resin 26.

According to step 102, the fixture 32 is transported to a dry station 20 which is then operated to dry the three dimensional article of manufacture 34. Step 102 is similar to steps 88, 90, and 92 in which the fluid source 67 is a pressurized source of gas for driving out and/or drying residual solvent.

According to step 104, the fixture is transported to a material injection station 22 which is then operated to fill the internal cavity 62 of the three dimensional article of manufacture 34. Step 104 is similar to steps 88, 90, and 92 in which the fluid source 67 is a liquid and/or fluidized build material. In an exemplary embodiment the three dimensional article of manufacture 34 acts as a mold for the injected build material.

According to step 106, the fixture is transported to a cure station 12 which is then operated to cure the three dimensional article of manufacture 34 and/or material that has been injected within. According to step 108, the fixture is then transported to the inspection station 14 which is then operated to inspect for critical dimensions and/or defects of the three dimensional article of manufacture 34 and/or injected material.

Other embodiments of the process sequence 94 are possible. Certain steps can be skipped or reordered. One embodiment includes all steps except for step 104. Another embodiment includes all steps except for step 106. Yet other embodiments may eliminate steps 106 and 108 or eliminate step 108. In some embodiments the cure step 106 may take place before and after step 104. Thus a number of different subsets and sequences are possible with respect to the steps of method 94.

The specific embodiments and applications thereof described above are for illustrative purposes only and do not preclude modifications and variations encompassed by the scope of the following claims.

What we claim is:

1. A three dimensional printing system comprising:
    a three dimensional print engine including:
        a vessel for containing photocurable resin including a transparent sheet at a lower end;
        a light engine for transmitting pixelated light up through the transparent sheet into the photocurable resin;
        a movement mechanism;
    a fluid processing station including a fluid injector port coupled to a fluid source, the fluid processing station is structurally separated from the three dimensional print engine;
    a fixture having a lower portion defining a lower face and a first fluid conduit coupled to the lower face;
    a transport mechanism; and
    a controller configured to:
        (a) position the lower face of the fixture in facing relation with the transparent sheet;
        (b) operate the three dimensional print engine including the light engine and the movement mechanism to form a three dimensional article of manufacture onto the lower face of the fixture, the three dimensional article of manufacture having an inside surface that defines an internal cavity and an inlet port that couples the internal cavity to the first fluid conduit of the fixture;
        (c) operate the transport mechanism to remove the fixture from the print engine and then transfer the fixture with the attached three dimensional article of manufacture to the fluid processing station and to place the fixture into the fluid processing station;
        (d) couple the fluid injector port of the fluid processing station to the first fluid conduit of the fixture;
        (e) operate the fluid source to inject fluid out of the fluid injector port, through the first fluid conduit and the inlet port, and to the internal cavity.

2. The three dimensional printing system of claim 1 wherein the injected fluid is one of a liquid cleaning solvent, a gas for drying, a build material, an etchant, a liquid containing a coating agent for coating an inside surface, and a liquid for partially melting an inside surface.

3. The three dimensional printing system of claim 1 wherein the three dimensional article of manufacture also defines an exit port coupled to the internal cavity to allow fluid to exit from the internal cavity concurrently with the fluid being injected into the internal cavity.

4. The three dimensional printing system of claim 3 wherein the fluid processing station includes a receptacle for receiving the fluid that is exiting the internal cavity through the exit port.

5. The three dimensional printing system of claim 3 wherein the fixture includes a second fluid conduit that is coupled to the exit port.

6. The three dimensional printing system of claim 1 wherein the fluid processing station is a rinse station and the injected fluid is a solvent for flushing uncured photocurable resin from the internal cavity.

7. The three dimensional printing system of claim 6 further comprising a drying station including a gas injector coupled to a gas pressure source, the controller further configured to:
    (f) operate the transport mechanism to transfer the fixture from the rinse station to the drying station;
    (g) couple the gas injector to the first fluid conduit; and
    (h) operate the gas pressure source to flush gas through the internal cavity to remove residual solvent from the internal cavity.

* * * * *